US011247551B2

(12) United States Patent
O'Brien

(10) Patent No.: US 11,247,551 B2
(45) Date of Patent: Feb. 15, 2022

(54) HYDRAULIC SYSTEM FOR ENGINE STARTER AND GENERATOR

(71) Applicant: CUMMINS INC., Columbus, IN (US)

(72) Inventor: John P. O'Brien, Columbus, IN (US)

(73) Assignee: Cummins Inc., Columbus, IN (US)

( * ) Notice: Subject to any disclaimer, the term of this patent is extended or adjusted under 35 U.S.C. 154(b) by 127 days.

(21) Appl. No.: 16/641,404

(22) PCT Filed: Sep. 8, 2017

(86) PCT No.: PCT/US2017/050656
§ 371 (c)(1),
(2) Date: Feb. 24, 2020

(87) PCT Pub. No.: WO2019/050532
PCT Pub. Date: Mar. 14, 2019

(65) Prior Publication Data
US 2020/0238812 A1   Jul. 30, 2020

(51) Int. Cl.
*B60K 6/12*   (2006.01)
*B60W 10/08*   (2006.01)
*F16H 61/4096*   (2010.01)

(52) U.S. Cl.
CPC .............. *B60K 6/12* (2013.01); *B60W 10/08* (2013.01); *F16H 61/4096* (2013.01); *B60K 2006/126* (2013.01)

(58) Field of Classification Search
CPC ... B60K 6/12; B60K 2006/126; B60W 10/06; B60W 10/08
See application file for complete search history.

(56) References Cited

U.S. PATENT DOCUMENTS

| 4,922,119 A | 5/1990 | Raad et al. |
| 6,170,587 B1 | 1/2001 | Bullock |
| 6,460,500 B1 * | 10/2002 | Ooyama ............... F02N 7/00 123/179.3 |
| 6,615,786 B2 | 9/2003 | Mori et al. |
| 7,252,020 B2 | 8/2007 | Gray et al. |

(Continued)

FOREIGN PATENT DOCUMENTS

CN          104903134 A          9/2015

OTHER PUBLICATIONS

Office Action for CN Application No. 201780094426.X, dated Aug. 10, 2020.

(Continued)

*Primary Examiner* — Jeffrey J Restifo
(74) *Attorney, Agent, or Firm* — Foley & Lardner LLP

(57) ABSTRACT

A hydraulic engine system includes a first hydraulic pump-motor coupled to an engine and a second hydraulic pump-motor coupled to an electric machine. A hydraulic link fluidly connects the first and the second hydraulic pump-motors. During a cranking operation mode, the electric machine operates as a motor and transfers power via the second hydraulic pump-motor, the hydraulic link and the first hydraulic pump-motor to provide cranking torque to the engine. During a generator operation mode, the power generated by the engine is transferred via the first hydraulic pump-motor, the hydraulic link, and the second hydraulic pump-motor to the electric machine, operating as a generator, to generate electricity.

22 Claims, 5 Drawing Sheets

(56) References Cited

U.S. PATENT DOCUMENTS

| | | | |
|---|---|---|---|
| 7,745,947 B2 | 6/2010 | Komiyama et al. | |
| 7,841,432 B2 | 11/2010 | Lynn et al. | |
| 8,288,880 B2 | 10/2012 | Olsen et al. | |
| 2003/0000492 A1* | 1/2003 | Mori | F02N 7/08 |
| | | | 123/179.31 |
| 2005/0164827 A1 | 7/2005 | Beaty et al. | |
| 2005/0167178 A1* | 8/2005 | Johnson | B60K 6/12 |
| | | | 180/306 |
| 2009/0018716 A1 | 1/2009 | Ambrosio | |
| 2012/0004797 A1 | 1/2012 | Baino et al. | |
| 2012/0173104 A1 | 7/2012 | Zhang | |
| 2013/0164148 A1 | 6/2013 | Kurkinen et al. | |
| 2013/0178328 A1* | 7/2013 | Arsenault | F16H 61/0031 |
| | | | 477/3 |
| 2014/0087916 A1 | 3/2014 | Johnson et al. | |
| 2014/0188321 A1* | 7/2014 | Ishida | B60W 10/06 |
| | | | 701/22 |
| 2014/0212305 A1* | 7/2014 | Krittian | B60W 20/19 |
| | | | 417/364 |
| 2015/0045167 A1 | 2/2015 | Lee et al. | |
| 2015/0052889 A1* | 2/2015 | Krittian | F02N 9/04 |
| | | | 60/596 |
| 2015/0246670 A1* | 9/2015 | Ideshio | B60W 10/02 |
| | | | 477/5 |
| 2016/0221448 A1 | 8/2016 | Pritchard | |
| 2017/0203749 A1* | 7/2017 | Imai | B60W 30/1888 |
| 2020/0040552 A1* | 2/2020 | Shibata | B60W 10/08 |
| 2020/0238812 A1* | 7/2020 | O'Brien | B60W 10/08 |

OTHER PUBLICATIONS

International Search Report for PCT Application No. PCT/US2017/050656, dated Dec. 20, 2017, pp. 1-2.

Written Opinion for PCT Application No. PCT/US2017/050656, dated Dec. 20, 2017, pp. 1-5.

* cited by examiner

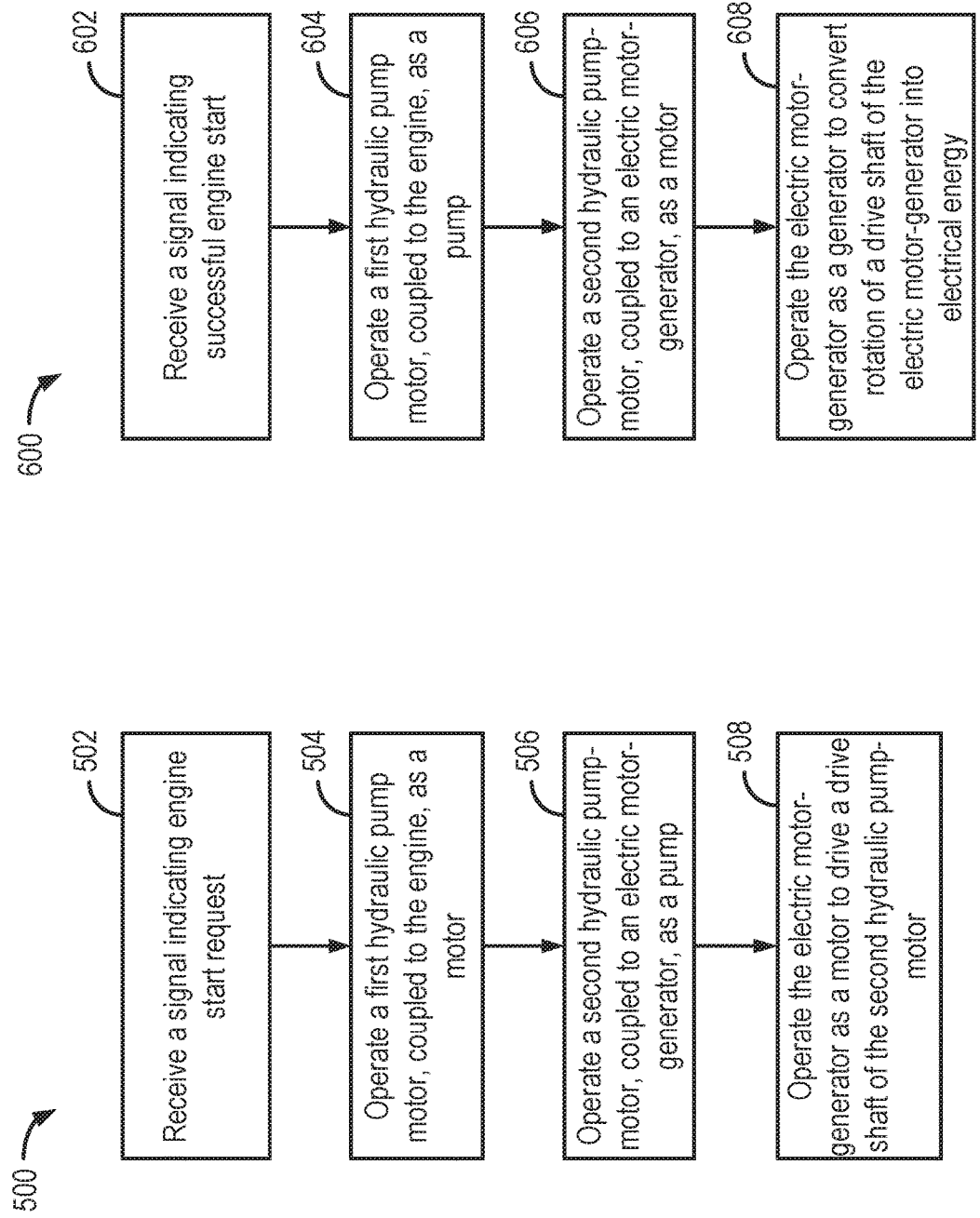

HYDRAULIC SYSTEM FOR ENGINE STARTER AND GENERATOR

CROSS-REFERENCE TO RELATED PATENT APPLICATIONS

This application is the U.S. national phase of PCT Application No. PCT/US2017/050656, filed Sep. 8, 2017, the content of which is incorporated herein by reference.

TECHNICAL FIELD

The present disclosure relates to internal combustion engine systems.

BACKGROUND

Systems using internal combustion engines can include a starter motor to provide starting torque to a crank shaft of the engine. The systems can additionally include an alternator/generator, coupled to the crank shaft or a drive shaft to generate electrical energy to charge a battery and to provide power to electrical loads in the system.

SUMMARY

In one aspect, a hydraulic drive system coupled to an engine and to an electric generator includes a first hydraulic pump-motor coupled to the engine and a second hydraulic pump-motor coupled to an electric motor-generator. The system further includes a hydraulic link carrying hydraulic fluid, the hydraulic link coupled between the first hydraulic pump-motor and the second hydraulic pump motor, the hydraulic link configured to transfer hydraulic fluid between the first hydraulic pump-motor and the second hydraulic pump-motor. The system also includes a controller coupled to the first hydraulic pump-motor and the second hydraulic pump-motor. The controller is configured to initiate a cranking mode by operating the second hydraulic pump-motor as a pump, and operating the first hydraulic pump-motor as a motor. The controller is also configured to initiate a generating mode by operating the first hydraulic pump-motor as a pump, and operating the second hydraulic pump-motor as a motor.

In one or more implementations, both the first hydraulic pump-motor and the second hydraulic pump-motor have fixed displacement. In one or more implementations, at least one of the first hydraulic pump-motor and the second hydraulic pump-motor is configured to have variable displacement. In one or more implementations, one of the first hydraulic pump-motor and the second hydraulic pump-motor is configured to have variable displacement, and the other of the first hydraulic pump-motor and the second hydraulic pump-motor is configured to have fixed displacement. In one or more implementations, the system further includes an engine interface coupling the first hydraulic pump-motor to the engine, the engine interface having a speed ratio greater than one. In one or more embodiments, the speed ratio is variable. In one or more implementations, the system further includes at least one hydraulic accumulator coupled to the hydraulic link. In one or more implementations, the controller is further configured to initiate the cranking mode additionally by operating one or more valves to fluidly couple the hydraulic accumulator to first hydraulic pump-motor.

In one or more implementations, the controller is configured to initiate the cranking mode by further operating the electric motor-generator as a motor. In one or more embodiments, the controller is configured to initiate the generating mode by further operating the electric motor-generator as a generator.

In another aspect, a controller communicably coupled to a first hydraulic pump-motor, which is mechanically coupled to an engine, and to a second hydraulic pump-motor, which is mechanically coupled to an electric motor-generator, includes a cranking initiating circuitry and a generator initiating circuitry. The cranking initiating circuitry is structured to operate the first hydraulic pump-motor as a motor and to operate the second hydraulic pump-motor as a pump to transfer energy from the electric motor-generator to a crank shaft of the engine via the second hydraulic pump-motor and the first hydraulic pump-motor. The generator initiating circuitry is structured to operate the first hydraulic pump-motor as a pump and to operate the second hydraulic pump-motor as a motor to transfer energy from the engine to a drive shaft of the electric motor-generator via the first hydraulic pump-motor and the second hydraulic pump-motor.

In one or more embodiments, the cranking initiation circuitry is further structured to select a first displacement value for the first hydraulic pump-motor, and the generator initiating circuitry is further structured to select a second displacement value for the first hydraulic pump-motor, and where the first displacement value is greater than the second displacement value. In one or more embodiments, the controller is communicably coupled to at least one accumulator fluidly coupled to a hydraulic link between the first hydraulic pump-motor and the second hydraulic pump-motor, where the at least one accumulator is configured to selectively store energy from, and provide energy to, the hydraulic link, and where the cranking initiation circuitry is further structured to operate the at least one accumulator to transfer energy from the at least one accumulator to the crank shaft of the engine via the hydraulic link and the first hydraulic pump-motor.

In another aspect, an apparatus includes an internal combustion engine, a first hydraulic pump-motor coupled to the internal combustion engine, an electric motor-generator, a second hydraulic pump-motor coupled to the electric motor generator, a hydraulic link fluidly coupling the first hydraulic pump-motor and the second hydraulic pump-motor, at least one accumulator coupled to the hydraulic link, the at least one accumulator configured to selectively store energy from, and provide energy to, the hydraulic link, and a controller. The controller includes a cranking initiation circuitry and a generator initiating circuitry. The cranking initiation circuitry is structured to operate the first hydraulic pump-motor as a motor and to operate the second hydraulic pump-motor as a pump to transfer energy from the electric motor-generator to a crank shaft of the engine via the second hydraulic pump-motor and the first hydraulic pump-motor, and to operate the at least one accumulator to provide energy to the engine via the hydraulic link and the first hydraulic pump-motor. The generator initiating circuitry is structured to operate the first hydraulic pump-motor as a pump and to operate the second hydraulic pump-motor as a motor to transfer energy from the engine to a drive shaft of the electric motor-generator via the first hydraulic pump-motor and the second hydraulic pump-motor.

In one or more embodiments, the cranking initiation circuitry is further structured to select a first displacement value for the first hydraulic pump-motor, where the generator initiating circuitry is further structured to select a second displacement value for the first hydraulic pump-motor, and the first displacement value is greater than the second displacement value. In one or more embodiments, both the first hydraulic pump-motor and the second hydraulic pump-motor have fixed displacement. In one or more embodiments, at least one of the first hydraulic pump-motor and the second hydraulic pump-motor is configured to have variable displacement. In one or more embodiments, one of the first hydraulic pump-motor and the second hydraulic pump-motor is configured to have variable displacement, and the other of the first hydraulic pump-motor and the second hydraulic pump-motor is configured to have fixed displacement. In one or more embodiments, the apparatus further includes an engine interface coupling the first hydraulic pump-motor to the engine, the engine interface having a speed ratio greater than one. In one or more embodiments, the speed ratio is variable. In one or more embodiments, the electric motor-generator is located remotely from the internal combustion engine.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

FIG. 5 shows a flow diagram of a representation of an example cranking process executed by the controller shown in FIG. 4.

FIG. 6 shows a flow diagram of a representation of a generating process executed by the controller shown in FIG. 4.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive internal combustion assemblies and methods of operating internal combustion assemblies. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Engine mounted electric machines, such as an electric starters and alternator/generators, can be used to not only provide a starting torque to start the engine, but also provide power to batteries and various other electronic components. For example, a starter, which is an electric motor, can be used to provide an initial torque to start the engine during a cranking operation. An alternator can generate and provide electric power to charge the battery and to power electrical systems when the engine is running. These electric machines can be mounted on the engine or in close proximity with the engine. For example, the electric machines can be mounted near the engine so as to form a mechanical coupling with the engine crank shaft or drive shaft. Due to their close proximity to the engine, these electric machines can be exposed to high temperatures and high vibrations levels. This exposure to high temperature and vibration levels can increase the cost of manufacture of the electrical machines or can reduce their durability and reliability. In addition, the starter motor, which is used to provide starting torque to the engine, operates at high torque and low speed. Starter motors designed for high torque and low speed tend to be bulky, which can put severe constraints on accommodating the starter motor on the engine.

The following discussion includes one or more systems that provide electrical machines operating in concert with an internal combustion engine. In particular, the electrical machines can be coupled to the engine using a hydraulic transmission. This allows the electrical machines to be situated remotely from the engine. As a result, the electrical machines are exposed to relatively lower temperatures and vibration levels, thereby reducing their cost and increasing their reliability. Furthermore, the hydraulic transmission can provide fixed or variable torque and speed ratios such that power from a high speed and low torque electrical machine can be appropriately transformed to meet the high torque desired for cranking the engine. Using the high speed electrical machines can reduce the size of the electrical machines as well as increase their efficiency.

Figure 1:
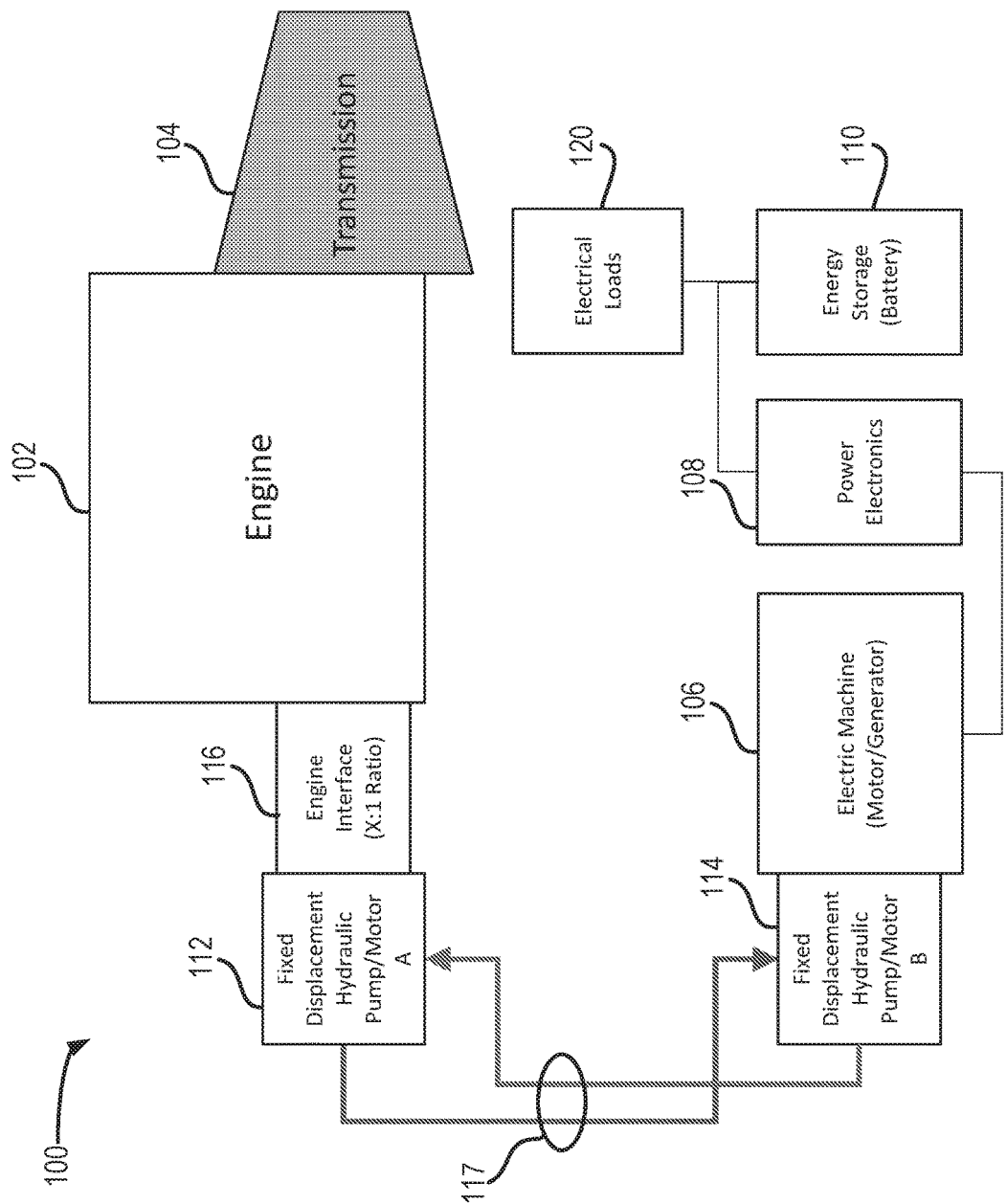
FIG. 1 shows a representation of a first example system, according to an embodiment of the present disclosure.

FIG. 1 shows a representation of a first example system 100. The first example system 100 includes an engine 102, a transmission 104, an electrical motor/generator (hereinafter referred to as "electric machine") 106, power electronics 108, energy storage/battery 110, a first fixed displacement hydraulic pump/motor (hereinafter referred to as "fixed displacement pump/motor-A") 112, and a second fixed displacement hydraulic pump/motor (hereinafter referred to as "fixed displacement pump/motor-B") 114. The fixed displacement pump/motor-A 112 is coupled to the engine 102 through an engine-pump/motor interface 116. The fixed displacement pump/motor-A 112 is coupled to the fixed displacement pump/motor-B 114 via a hydraulic link 117. As discussed further below, the first example system 100 includes a fixed speed or torque ratio between the engine 102 and the electric machine 106.

The engine 102 can be any internal combustion engine that can utilize non-gaseous or gaseous fuel. For example, the engine 102 can include engines such as, for example, gasoline engines, diesel engines, natural gas engines, and the like. The engine 102 can include a crank-shaft (not shown) coupled to one or more cylinders (not shown) of the engine 102. A reciprocating motion of the cylinders is transformed into a rotary motion of the crank-shaft. Conversely, the rotary motion of the crank-shaft can be transformed into reciprocating motion of the cylinders. The crank-shaft can be coupled to one or more additional components, such as a transmission 118.

The transmission 118 can convert torque and power provided by the crank-shaft and provide the converted torque and power to a drive-shaft (not shown). The transmission 118 can include one or more gearboxes to carry out the torque and power conversions. In one or more implementations, the transmission 118 can provide variable torque and power conversion, where the ratio of conversion can be selected automatically by a controller or manually by a driver. In some implementations, the crank-shaft or the drive-shaft may also be coupled to a flywheel (not shown).

The engine-pump/motor interface 116 provides coupling between the engine 102 and the fixed displacement pump/motor-A 112. In one or more implementations, the engine pump/motor interface 116 can include a gear-train or an equivalent mechanism to transfer torque and power between the crank-shaft of the engine 102 and a rotating drive shaft (not shown) of the fixed displacement pump/motor-A 112. The engine pump/motor interface 116 can provide fixed or variable conversion ratios, where a conversion ratio describes a ratio of a number of rotations of the drive shaft of the fixed displacement pump/motor-A 112 to a number of revolutions of the crank-shaft of the engine 102. The conversion ratio can be denoted as X:1. In one or more embodiments, the conversion ratio can be fixed; that is, the conversion ratio may not be changed over time. In some other embodiments, the conversion ratio can be variable, that is the conversion ratio can be changed over time. Where the conversion ratio is variable, the conversion ratio can be changed mechanically by way of physically adjusting a conversion ratio lever/knob/switch on the engine pump/motor interface 116. The conversion ratio also can be changed using electronic actuators, where an electrical actuation signal can result in a corresponding selection of conversion ratio. For example, the electrical actuation signal can be sent by an electronic controller.

The fixed displacement pump/motor-A 112 can include a reversible hydraulic pump/motor unit capable of functioning both as a hydraulic pump and as a hydraulic motor. The fixed displacement pump/motor-A 112 can have a drive shaft coupled to the engine pump/motor interface 116, as discussed above. In addition, the fixed displacement pump/motor-A 112 can include hydraulic input and output ports that are coupled to the hydraulic link 117. The hydraulic input and output ports receive hydraulic fluid from and send hydraulic fluid to the hydraulic link 117. When operating as a motor, the fixed displacement pump/motor-A 112 transforms the displacement of the hydraulic fluid into rotational motion of the drive shaft. When operating as a pump, the fixed displacement pump/motor-A 112 transforms the rotational motion of the drive shaft into displacement of the hydraulic fluid. The fixed displacement pump/motor-A 112 can include a digital-displacement (DD) pump/motor unit, such as a DD reciprocating (radial or axial) hydraulic machine, swash (wobble) place hydraulic machine, and the like.

The fixed displacement pump/motor-B 114 can be similar to the fixed displacement pump/motor-A 112 discussed above, and can include a reversible hydraulic pump/motor unit capable of functioning both as a hydraulic pump and as a hydraulic motor. The fixed displacement pump/motor-B 114 includes hydraulic input and output ports coupled to the hydraulic link 117, and a drive shaft that is coupled to an electric machine drive shaft of the electric machine 106.

The electric machine 106 can include an electric motor/generator such as a direct current ("DC") or an alternating current ("AC") electric motor/generator. The electric machine 106 can be capable of operating both as a motor and as a generator. For example, when operating as a motor, the electric machine 106 can transform electrical energy into rotational motion of the electric machine drive shaft coupled to the fixed displacement pump/motor-B 114. When operating as a generator, the electric machine 106 can transform rotational motion of the electric machine drive shaft into electrical energy. The generated electrical energy can be provided to power electronics 108, which in turn provide power to electrical loads 120, and to charge the battery 110. When operating as a motor, the electric machine 106 can draw power from the battery 110 (directly or via the power electronics 108).

The first example system 100 can be operated in at least two operating modes: a generating mode and a cranking mode. In the generating mode, mechanical energy from the engine 102 is transferred to the electric machine 106 for generating electrical energy. That is, the rotational motion of the crank or drive shaft of the engine 102 is transferred to the fixed displacement pump/motor-A 112. The fixed displacement pump/motor-A 112 operates as a pump and transforms the rotational motion of the crank or drive shaft into displacement of hydraulic fluid through the hydraulic link 117. The displacement of the hydraulic fluid in the hydraulic link 117 is transformed into rotational motion of a drive shaft of the fixed displacement pump/motor-B 114, which operates as a motor. Finally, the electrical machine 106, coupled to the fixed displacement pump/motor-B 114, transforms the rotational motion of the drive shaft into electrical energy. In the cranking mode of operation, electrical energy from the battery or another source, is transferred to the engine 102 to rotate the crank shaft or the drive shaft to start the engine 102. The electric machine 106 transforms electrical energy received from the battery 110 into rotational motion of the drive shaft of the electric machine 106. The fixed displacement pump/motor-B 114, which is coupled to the drive shaft, operates as a pump, and transforms the rotational motion into displacement of hydraulic fluid in the hydraulic link 117. The displacement of the hydraulic fluid in the link 117 is transformed into rotational motion of the drive shaft of the fixed displacement pump/motor-A 112, which operates as a motor. The rotational motion of the drive shaft of the fixed displacement pump/motor-A 112 is transferred to the crank shaft or the drive shaft of the engine 102.

As mentioned above, the first example system 100 includes a fixed speed or torque ratio between the engine 102 and the electric machine 106. Assuming that the displacement (in cubic-centimeters/revolution ("cc/rev")) for the fixed displacement pump/motor-A 112 and the fixed displacement pump/motor-B 114 is denoted by "A" and "B" respectively, the speed ($N_{elec}$ in revolutions-per-minute ("rpm")) of the electric machine 106 can be expressed with Equation (1) below, where $N_{engine}$ denotes (in rpm) the speed of the engine and "X" denotes the conversion ratio of the engine pump/motor interface 116:

$$N_{elec} = N_{engine} * X * (A/B) \qquad (1)$$

For example, if the speed $N_{engine}$ is 1000 rpm; the displacements (A and B) of the fixed displacement pump/motor-A 112 and the fixed displacement pump/motor-B 114 are equal to 2 and 1, respectively; and the conversion ratio, X, of the engine pump/motor interface 116 is equal to 1; then the corresponding speed $N_{elec}$ of the electric machine 106 is equal to 1000*1*(2/1)=2000 rpm.

With regard to torque, the torque $T_{engine}$ (in newton-meter ("Nm")) of the engine 102 and can be expressed with Equation (2) below, where $T_{elec}$ denotes (in Nm) the torque provided by the electric machine 106;

$$T_{engine} = T_{elec} * (A/B) \qquad (2)$$

For example, if the torque $T_{elec}$ of electric machine is equal to 100 Nm; and the displacements (A and B) of the fixed displacement pump/motor-A 112 and the fixed displacement pump/motor-B 114 are equal to 2 and 1, respectively, torque $T_{engine}$ at the engine is equal to 100*(2/1)=200 Nm.

As shown in Equations (1) and (2), the speed and torque ratios between the electric machine 106 and the engine 102 can be selected based on the relative displacements of the fixed displacement pump/motor-A 112 and the fixed displacement pump/motor-B 114.

Figure 2:
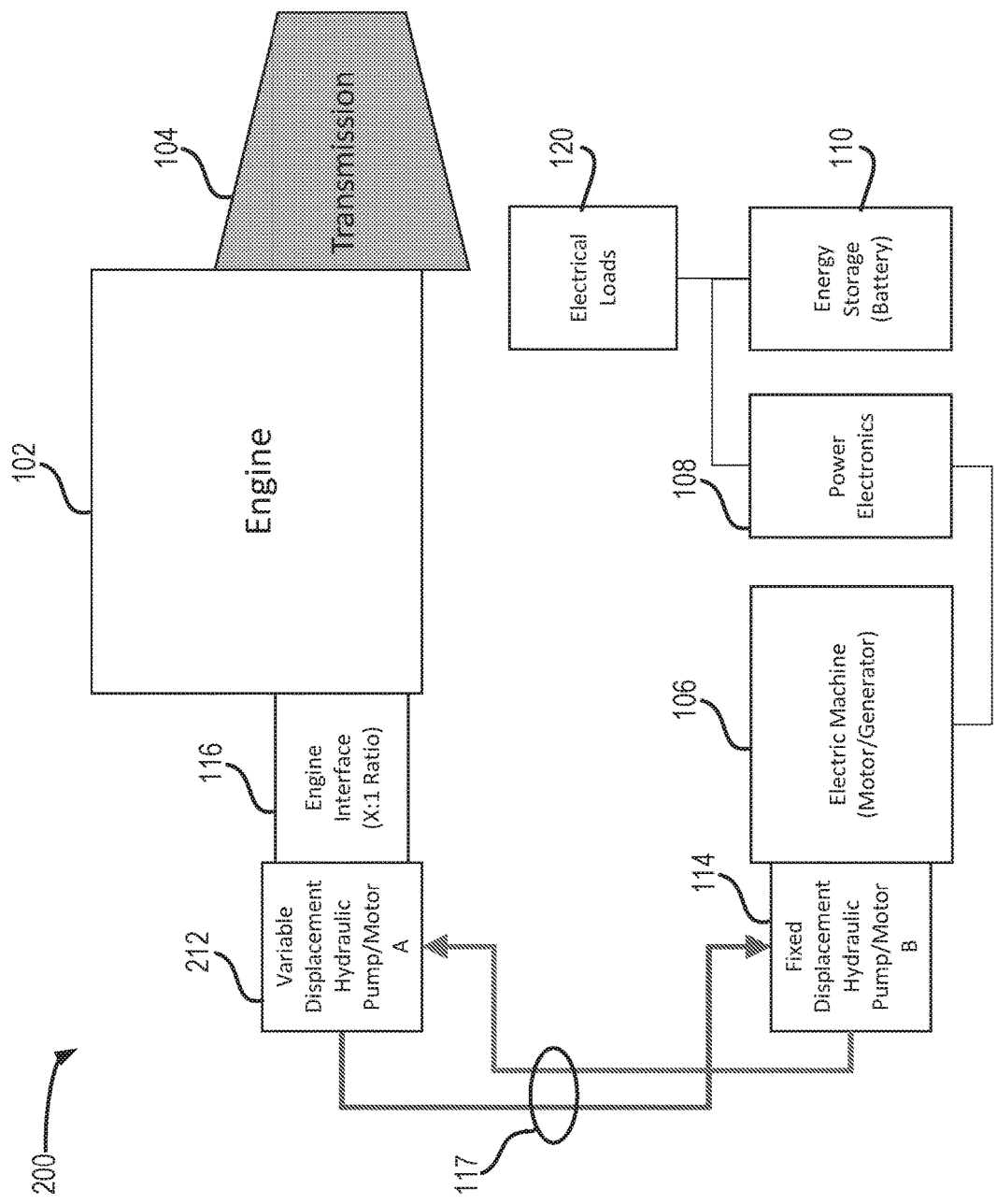
FIG. 2 shows a representation of a second example system, according to an embodiment of the present disclosure.

FIG. 2 shows a representation of a second example system 200. The second example system 200 includes components that are similar to those included in the first example system 100 shown in FIG. 1. Accordingly, like elements are referred to with like reference numerals. However, unlike the first example system 100, which includes fixed displacement pump/motors, the second example system 200 includes one variable displacement hydraulic pump/motor and one fixed displacement pump/motor. In particular, the second example system 200 includes a variable displacement hydraulic pump/motor-A ("variable displacement pump/motor-A") 212 coupled to the engine 102 via the engine pump/motor interface 116. In one or more embodiments, the hydraulic pump/motor coupled to the electric machine 106 can be of the variable displacement type, and the hydraulic pump/motor coupled to the engine 102 can be of the fixed displacement type. In one or more embodiments, both hydraulic pump/motors coupled to the engine 102 and to the electric machine 106 can be of the variable displacement type. The displacement of the variable displacement pump/motor-A 212 can be varied in discrete steps of two or more, such as about 10 or about 20. The displacement of the variable displacement pump/motor-A 212 also can be varied continuously.

The displacement "A" of the variable displacement pump/motor-A 212 can be selected at runtime to select the appropriate torque and speed ratio between the electric machine 106 and the engine 102. For example, when the second example system 200 is operating in the cranking mode, the displacement "A" of the variable displacement pump/motor-A 212 can be increased such that high speeds and low torque at the electric machine 106 can be transformed into relatively higher torque and low speeds at the engine 102. For example, the displacement "A" can be increased to a value that provides the desired torque $T_{engine}$ (e.g., Equation (2)) for successfully starting the engine 102. When the second example system 200 is operating in the generating mode, the displacement "A" of the variable displacement pump/motor-A 212 can be selected to an appropriate value for the desired speed and torque of the electric machine 106. As an example, when operating in the cranking mode the displacement of the variable displacement pump/motor-A 212 can be greater than the displacement of the variable displacement pump/motor-A 212 when operating in the generating mode.

Figure 3:
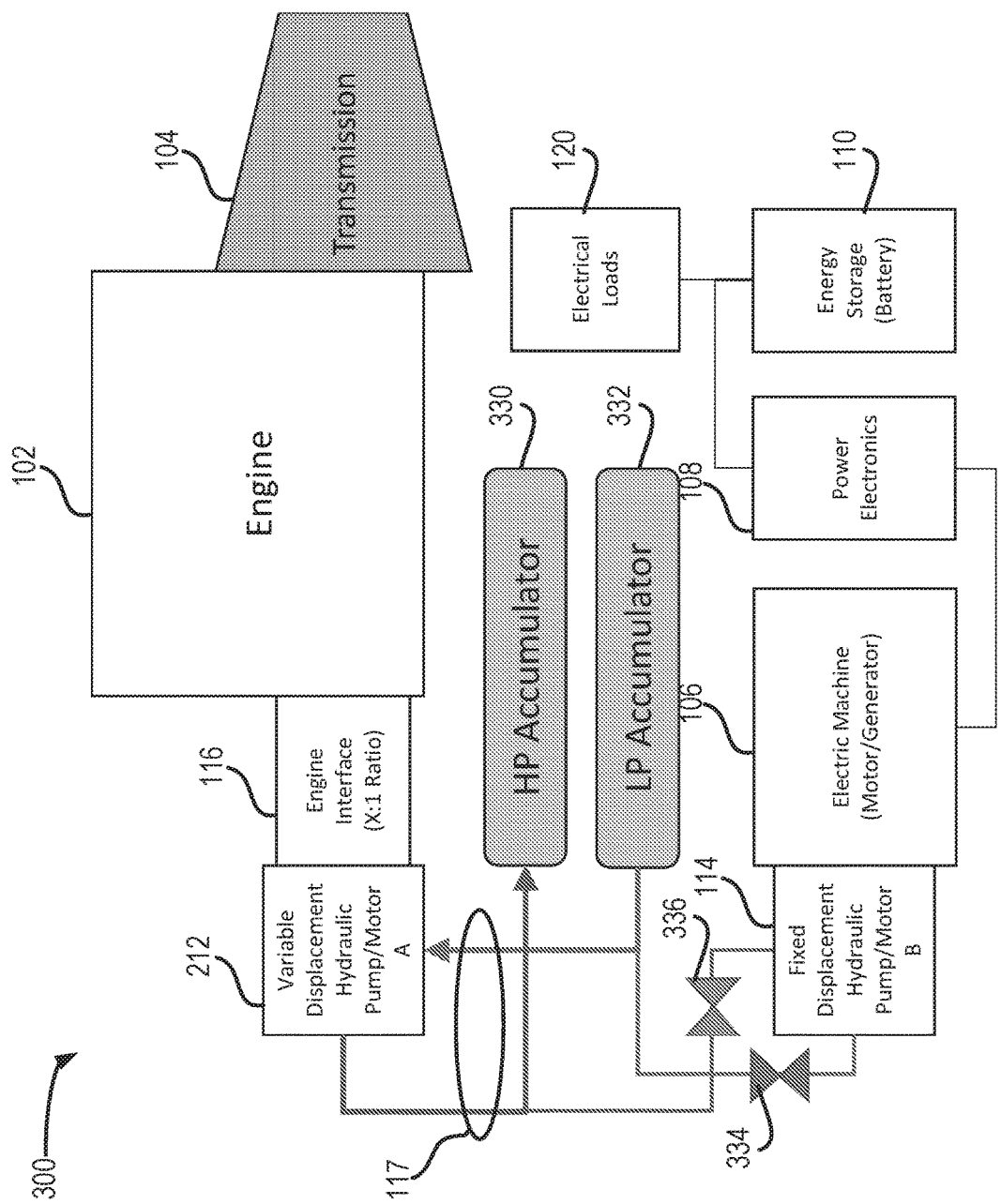
FIG. 3 depicts a representation of a third example system, according to an embodiment of the present disclosure.

FIG. 3 depicts a representation of a third example system 300. The third example system 300 includes components similar to those included in the second example system 200 shown in FIG. 2. However, the third example system 300 additionally includes a high pressure ("HP") accumulator 330, a low pressure ("LP") accumulator 332, a first valve 334 and a second valve 336. The HP accumulator 330 and the LP accumulator 332 can include hydraulic accumulators that are operable to store energy from, and release energy into, the hydraulic link 117. Hydraulic accumulators, for example, can include hydro-pneumatic accumulators, such as gas charged bladder accumulators, or the like.

Energy can be stored in the HP accumulator 330 or the LP accumulator 332 and released to provide either torque or to charge the battery when needed. For example, during a braking event, hydraulic fluid in the hydraulic link 117 can be partially or completely diverted from the fixed displacement pump/motor-B 114 and into the HP accumulator 330 or the LP accumulator 334. The first valve 334 and the second valve 336 can be partially or fully closed to divert the hydraulic fluid.

When high torque is needed, such as during cranking the engine 102, the pressurized hydraulic fluid from the HP accumulator 330 or the LP accumulator 332 can be released into the variable displacement pump/motor-A 212, which cranks the engine 102. The accumulated energy in the HP accumulator 330 or the LP accumulator 332 also can be diverted to run the fixed displacement pump/motor-B 114, which, in turn, can provide mechanical energy to the electric machine 106. The electric machine 106 can transform the mechanical energy into electrical energy to charge the battery 110 or power the electrical loads 120. The diversion of the accumulated energy from the HP accumulator 330 or the LP accumulator 332 to the fixed displacement pump/motor-B 114 for generation of electrical energy can be carried out whether the engine 102 is running or when the engine 102 is stopped. In some implementations, the fixed displacement pump/motor-B 114 may drive a mechanical link, which is coupled to mechanical loads (not shown), such as engine accessories (air conditioning, coolant circulation, radiator fan, power steering, PTO output, etc.), in addition to, or instead of, the electric engine 106. The accumulated energy can then directly drive mechanical loads and the electric loads 120, when the engine 102 is stopped or when the engine 102 is running.

In some implementations, the HP accumulator 330 or the LP accumulator 332 can be pre-charged prior to the initiation of a cranking operation. For example, a controller, prior to starting the engine, can start the electric machine 106 and operate the fixed displacement pump/motor-B 114 as a pump. Further, the controller can operate the first valve 334 and the second valve 336 such that the hydraulic fluid displaced by the fixed displacement pump-motor-B 114 is stored in the HP accumulator 330 or the LP accumulator 332. When cranking the engine 102, the accumulated energy stored in the HP accumulator 330 or the LP accumulator 332 can be used to provide additional torque for the cranking operation.

In some implementations, the HP accumulator 330 or the LP accumulator 332 can be used to provide a toque boost while the engine 102 is running. For example, during engine 102, a controller can monitor the load on the engine 102 and determine a high load operation, for example, by determining that the load on the engine 102 exceeds a threshold value. Upon determining a high load condition, the controller can operate the first and second valves 334 and 336 such that the accumulated energy stored in the HP accumulator 330 or the LP accumulator 332 is transferred to the engine 102 crank shaft via the variable displacement pump/motor-A 212, thereby increasing the torque provided to the engine shaft. The ability of providing a torque boost can allow the engine 102 to be reduced in size or power output, thereby reducing overall costs and/or increasing efficiency.

For synchronous AC power generation, the speed of the variable displacement pump/motor-A 212 and the stored energy in the HP accumulator 330 or the LP accumulator 332 can be controlled so as to maintain a regulated synchronous speed of the fixed displacement pump/motor-B 114 or to maintain a constant total electric power output or maintain a synchronous AC output frequency, such as 50 Hz or 60 Hz.

The third example system 300 also can include additional valves, similar to the first and second valves 334 and 336, that are positioned on the hydraulic link 117 between the HP accumulator 330 or the LP accumulator 332 and the variable displacement pump/motor-A 212. A controller can control these valves in addition to the first and the second valves 334 and 336 to store energy in, or release energy from, the HP accumulator 330 or the LP accumulator 332.

By using a hydraulic link 117 between the engine 102 and the electric machine 106, the electric machine 106 can be positioned remotely from the crank shaft or the drive shaft of the engine 102. As a result, the electric machine 106 is not exposed to high temperatures and high level of vibrations. This reduces the size and cost of the electric machine 106 and improves the reliability of the electric machine 106. Further cost reductions can be achieved by designing the electric machine 106 to be air cooled, instead of fan cooled, which may have to be used if the electric machine 106 is mounted near the engine 102.

By providing a fixed or variable torque and speed ratio between the torque and speed of the engine 102 and the electric machine 106, the electric machine 106 can be implemented using high speed electric motors while still providing high torque to crank the engine 102. Using high speed electric motors also can improve the efficiency of the electric machine 106. Using variable displacement pump/motors, infinitely variable torque and speed ratios can be provided. In one or more embodiments, the electric machine 106 can be mounted in the vicinity of or remotely from the engine 102.

In one or more embodiments, the hydraulic link 117 also can connect to other hydraulic systems on the vehicle, such as power steering system and hydraulic cooling fan drives.

Each of the systems discussed above can include a controller or a processor for controlling all of the components of the system. For example the controller can control the displacement of the variable displacement pump/motor-A 212, the conversion ratio of the engine pump/motor interface 116, the HP accumulator 330, the LP accumulator 332, the first valve 334 and the second valve 336. The controller can also control the operation of the engine 102, the electric machine 106, the power electronics 108, the battery 110 and the electrical loads 120. The controller also can control the operation of the system, such as selecting whether the system is in a cranking mode or in a generation mode. The controller can send electrical signals to one or more actuators associated with one or more of the above-mentioned components to control their operation.

Figure 4:
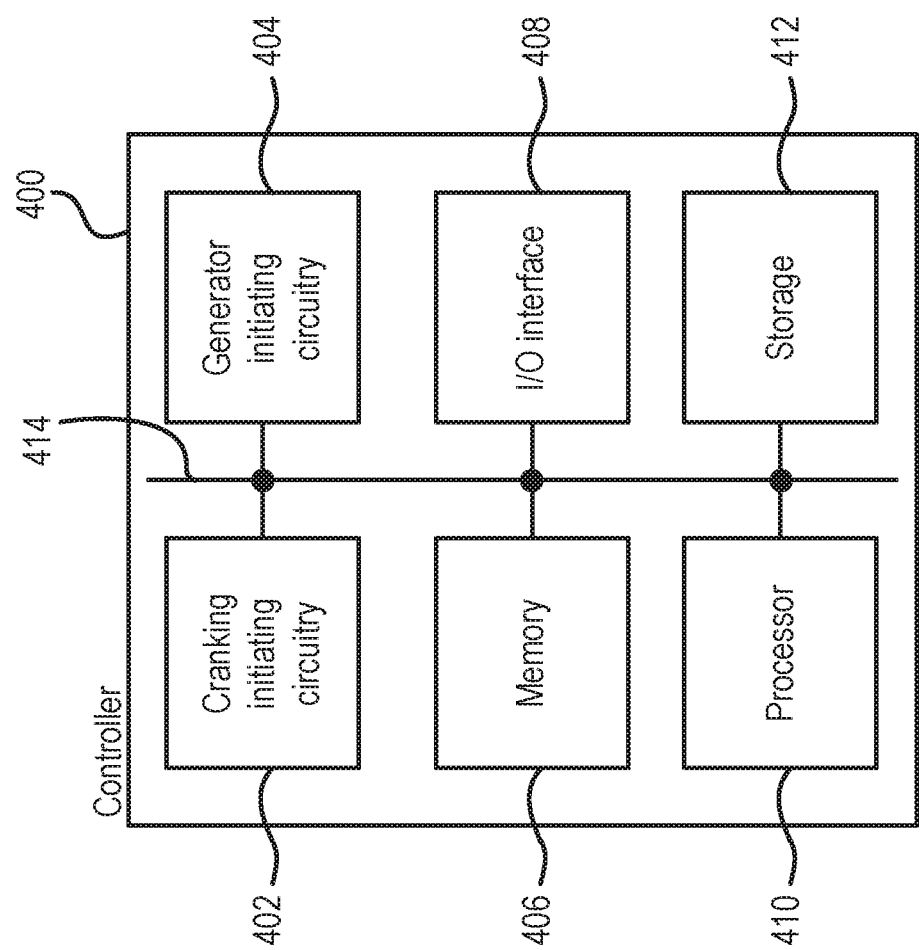
FIG. 4 depicts a representation of a controller for facilitating the operation of the systems discussed above in relation to FIGS. 1-3.

FIG. 4 depicts a representation of a controller 400 for facilitating the operation of systems discussed above in relation to FIGS. 1-3. The controller 400 can include a cranking initiation circuitry 402 a generator initiation circuitry 404, memory 406, an input/output (I/O) interface 408, a processor 410, and storage 412. The above mentioned components can communicate with each other over a bus 414. The cranking initiation circuitry 402 can include circuitry structured to initiate and control a cranking operation of the engine 102. The generator initiating circuitry 404 can include circuitry structured to initiate and control an electrical energy generation operation. The memory 406 can include volatile or non-volatile memory for storing data configuration information related to the controller. The I/O interface 408 can include circuitry for receiving electrical signals from various components outside of the controller 400 such as sensors and other controllers. The I/O interface 408 can transform the received electrical signals into digital or analog signals for communication to other components of the controller 400. The I/O interface 408 also can transform digital or analog data from one or more components of the controller 400 into electrical signals, and transmit those electrical signals to various components outside of the controller 400 such as actuators and other controllers. The processor 410 can include a digital or analog processor capable of executing instructions, receiving input data and generating output data. Storage 412 can include data storage such as magnetic disk storage and solid state storage.

FIG. 5 shows a flow diagram of a representation of an example cranking process 500 executed by the controller 400 shown in FIG. 4. The process 500 depicted in FIG. 5 can be executed by the cranking initiating circuitry 402 shown in FIG. 4. The process 500 includes receiving a signal indicating an engine start request (502). For example, the signal can be received from an engine controller, an engine start/stop button pressed by a user. The cranking initiating circuitry 402, in response to receiving the signal, can operate the first hydraulic pump-motor, coupled to the engine, as a motor (504). For example, the cranking initiating circuitry 402 can generate a signal which, when received by the hydraulic pump-motor-A 112 or 212 causes the hydraulic pump-motor-A 112 or 212 to operate as a motor. The I/O interface 408 can transform the signal prior to communication to the hydraulic pump-motor-A 112 or 212.

The cranking initiating circuitry 402 can further operate the second hydraulic pump-motor, coupled to an electric motor-generator, as a pump (506). For example, the controller can generate a signal, which when received by the fixed displacement pump-motor-B 114, causes the fixed displacement pump-motor-B 114 to operate as a pump. The I/O interface 408 can transform the signal prior to communicating the signal to the fixed displacement pump-motor-B 114.

The cranking initiating circuitry 402 can further operate the electric motor-generator as a motor to rotate a drive-shaft of the second hydraulic pump-motor (508). For example, the cranking initiating circuitry 402 can generate a signal which, when received by the electric machine 106 causes the electric machine 106 to operate as a motor. In operating as motor, the electric machine 106 transforms electrical energy from the battery 110 into rotational motion of an electric machine 106 drive shaft coupled to a drive shaft of the fixed displacement pump-motor-B 114. As discussed above in relation to FIGS. 1-3, the rotational motion of the drive shaft of the fixed displacement pump-motor-B 114 is transformed to a rotational motion of a crank shaft or drive shaft of the engine 102, thereby providing cranking force to the engine 102. The individual process stages in the process 500 discussed above can be performed in any order. In addition, two or more individual process stages in the process 500 can be performed simultaneously.

FIG. 6 shows a flow diagram of a representation of a generating process 600 executed by the controller 400 shown in FIG. 4. In particular, the process 600 can be executed by the generator initiating circuitry 404 shown in FIG. 4. The process 600 includes receiving a signal indicating successful engine start (602). For example, the generator initiating circuitry 404 can receive a signal from an engine controller or a sensor indicating that the engine 102 is running and that no cranking torque is needed. The process 600 further includes operating a first hydraulic pump-motor, coupled to the engine, as a pump (604). For example, the generator initiating circuitry 404 can send a signal to the hydraulic pump-motor 112 or 212 to operate as a pump. The process 600 also includes operating a second hydraulic pump-motor, coupled to an electric motor-generator, as a motor (606). For example, the generator initiating circuitry 404 can communicate a signal to the fixed displacement pump-motor-B 114 to operate as a motor. The process 600 further includes operating the electric motor-generator as a generator to convert rotation of a drive shaft of the electric motor-generator into electrical energy (608). For example, the generator initiating circuitry 404 can send a signal to the electric machine 106 to transform the rotational energy of its drive shaft, provided by the fixed displacement pump-motor-B 114, into electrical energy.

In some implementations, such as the ones shown in FIGS. 2 and 3, where the hydraulic pump/motor-A 212 is a variable displacement pump/motor, the processes 500 and 600 can also include adjusting a displacement value of the hydraulic pump/motor-A 212. The selection of the displacement value for a cranking operation and a generating operation is discussed above in relation to FIGS. 2 and 3. In implementations, such as that shown in FIG. 3, where accumulators 330 or 332 are coupled to the hydraulic link 117, the process 500 and 600 can further include appropriately operating the accumulators 330 and 332 and valves 334 and 336 to store energy in the accumulators 330 and 332, and to extract energy from the accumulators 330 and 332. The operation of the accumulators 330 and 332 is discussed above in relation to FIG. 3. The individual process stages in the process 600 discussed above can be performed in any order. In addition, two or more individual process stages in the process 600 can be performed simultaneously.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A hydraulic drive system coupled to an engine and to an electric motor-generator, comprising:
   a first hydraulic pump-motor mechanically coupled to the engine;
   a second hydraulic pump-motor mechanically coupled to the electric motor-generator;
   a hydraulic link carrying hydraulic fluid, the hydraulic link coupled between the first hydraulic pump-motor and the second hydraulic pump-motor, the hydraulic link configured to transfer hydraulic fluid between the first hydraulic pump-motor and the second hydraulic pump-motor; and
   a controller coupled to the first hydraulic pump-motor and the second hydraulic pump-motor, the controller configured to:
   initiate a cranking mode by operating the second hydraulic pump-motor as a pump, and operating the first hydraulic pump-motor as a motor, and initiate a generating mode by operating the first hydraulic pump-motor as a pump, and operating the second hydraulic pump-motor as a motor.

2. The system of claim 1, wherein both the first hydraulic pump-motor and the second hydraulic pump-motor have fixed displacement.

3. The system of claim 1, wherein at least one of the first hydraulic pump-motor and the second hydraulic pump-motor is configured to have variable displacement.

4. The system of claim 1, wherein one of the first hydraulic pump-motor and the second hydraulic pump-motor is configured to have variable displacement, and the other of the first hydraulic pump-motor and the second hydraulic pump-motor is configured to have fixed displacement.

5. The system of claim 1, further comprising an engine interface coupling the first hydraulic pump-motor to the engine, the engine interface having a speed ratio greater than one.

6. The system of claim 5, wherein the speed ratio is variable.

7. The system of claim 1, further comprising at least one hydraulic accumulator coupled to the hydraulic link, the controller further configured to initiate the cranking mode additionally by operating one or more valves to fluidly couple the hydraulic accumulator to first hydraulic pump-motor.

8. The system of claim 1, wherein the controller is configured to initiate the cranking mode by further operating the electric motor-generator as a motor.

9. The system of claim 1, wherein the controller is configured to initiate the generating mode by further operating the electric motor-generator as a generator.

10. A controller communicably coupled to a first hydraulic pump-motor, which is mechanically coupled to an engine, and to a second hydraulic pump-motor, which is mechanically coupled to an electric motor-generator, the controller comprising:
cranking initiation circuitry structured to operate the first hydraulic pump-motor as a motor and to operate the second hydraulic pump-motor as a pump to transfer energy from the electric motor-generator to a crank shaft of the engine via the second hydraulic pump-motor and the first hydraulic pump-motor; and
generator initiating circuitry structured to operate the first hydraulic pump-motor as a pump and to operate the second hydraulic pump-motor as a motor to transfer energy from the engine to a drive shaft of the electric motor-generator via the first hydraulic pump-motor and the second hydraulic pump-motor.

11. The controller of claim 10,
wherein the cranking initiation circuitry is further structured to select a first displacement value for the first hydraulic pump-motor,
wherein the generator initiating circuitry is further structured to select a second displacement value for the first hydraulic pump-motor, and
wherein the first displacement value is greater than the second displacement value.

12. The controller of claim 10, wherein the controller is communicably coupled to at least one accumulator fluidly coupled to a hydraulic link between the first hydraulic pump-motor and the second hydraulic pump-motor, the at least one accumulator configured to selectively store energy from, and provide energy to, the hydraulic link, wherein the cranking initiation circuitry is further structured to operate the at least one accumulator to transfer energy from the at least one accumulator to the crank shaft of the engine via the hydraulic link and the first hydraulic pump-motor.

13. An apparatus comprising:
an internal combustion engine;
a first hydraulic pump-motor coupled to the internal combustion engine;
an electric motor generator;
a second hydraulic pump-motor coupled to the electric motor generator;
a hydraulic link fluidly coupling the first hydraulic pump-motor and the second hydraulic pump-motor;
at least one accumulator coupled to the hydraulic link, the at least one accumulator configured to selectively store energy from, and provide energy to, the hydraulic link; and
a controller comprising:
a cranking initiation circuitry structured to operate the first hydraulic pump-motor as a motor and to operate the second hydraulic pump-motor as a pump to transfer energy from the electric motor-generator to a crank shaft of the internal combustion engine via the second hydraulic pump-motor and the first hydraulic pump-motor, and to operate the at least one accumulator to provide energy to the internal combustion engine via the hydraulic link and the first hydraulic pump-motor,
a generator initiating circuitry structured to operate the first hydraulic pump-motor as a pump and to operate the second hydraulic pump-motor as a motor to transfer energy from the internal combustion engine to a drive shaft of the electric motor-generator via the first hydraulic pump-motor and the second hydraulic pump-motor.

14. The apparatus of claim 13, wherein the cranking initiation circuitry is further structured to select a first displacement value for the first hydraulic pump-motor,
wherein the generator initiating circuitry is further structured to select a second displacement value for the first hydraulic pump-motor, and
wherein the first displacement value is greater than the second displacement value.

15. The apparatus of claim 13, wherein both the first hydraulic pump-motor and the second hydraulic pump-motor have fixed displacement.

16. The apparatus of claim 13, wherein at least one of the first hydraulic pump-motor and the second hydraulic pump-motor is configured to have variable displacement.

17. The apparatus of claim 13, wherein one of the first hydraulic pump-motor and the second hydraulic pump-motor is configured to have variable displacement, and the other of the first hydraulic pump-motor and the second hydraulic pump-motor is configured to have fixed displacement.

18. The apparatus of claim 13, further comprising an engine interface coupling the first hydraulic pump-motor to the internal combustion engine, the engine interface having a speed ratio greater than one.

19. The apparatus of claim 18, wherein the speed ratio is variable.

20. The apparatus of claim 13, the electric motor-generator is located remotely from the internal combustion engine.

21. The apparatus of claim 13, wherein the generator initiating circuitry is further structured to store energy from the hydraulic link to the at least one accumulator during a braking operation.

22. The apparatus of claim 13, further comprising:
a first valve on the hydraulic link positioned between the first hydraulic pump-motor and the at least one accumulator; and
a second valve on the hydraulic link positioned between the second hydraulic pump-motor and the at least one accumulator.

* * * * *